July 17, 1962
H. E. BOWERMAN
3,044,596
LONG STROKE HIGH SPEED CLUTCH TUBE
Filed Jan. 13, 1958
2 Sheets-Sheet 1
FIG. I
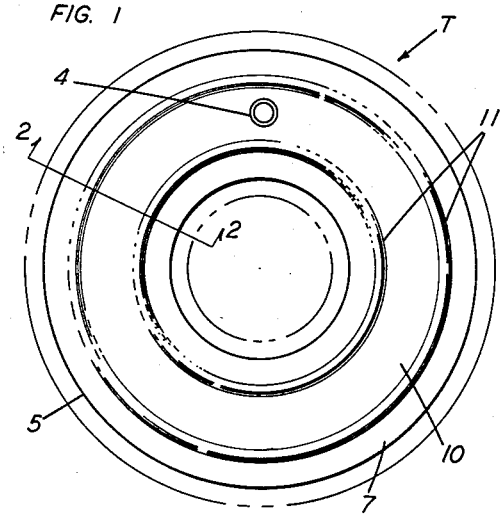
FIG. II
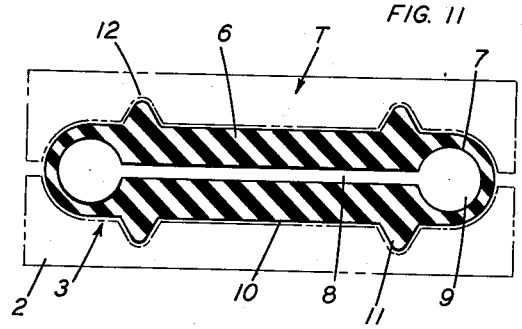
FIG. III
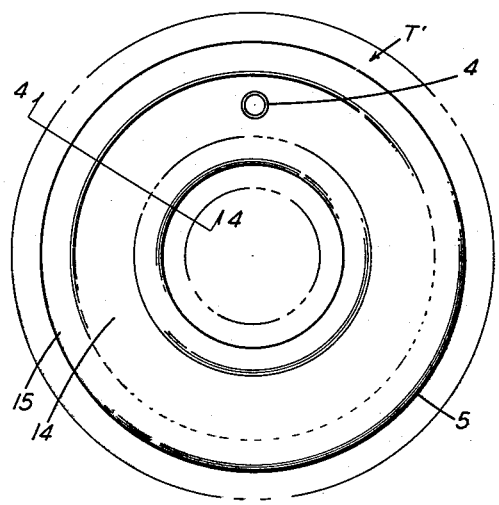
FIG. IV
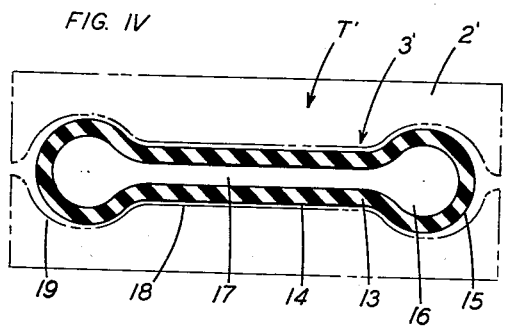
FIG. V
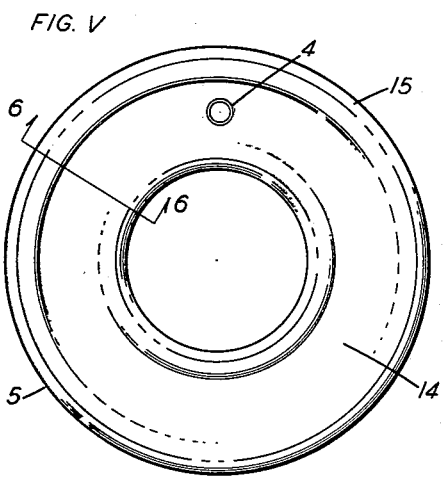
FIG. VI
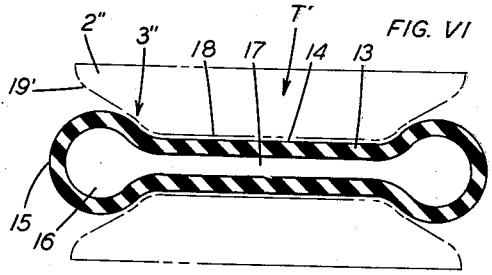
INVENTOR.
HULIE E. BOWERMAN
BY
*[signature]*
ATTORNEY July 17, 1962   H. E. BOWERMAN   3,044,596
LONG STROKE HIGH SPEED CLUTCH TUBE
Filed Jan. 13, 1958   2 Sheets-Sheet 2
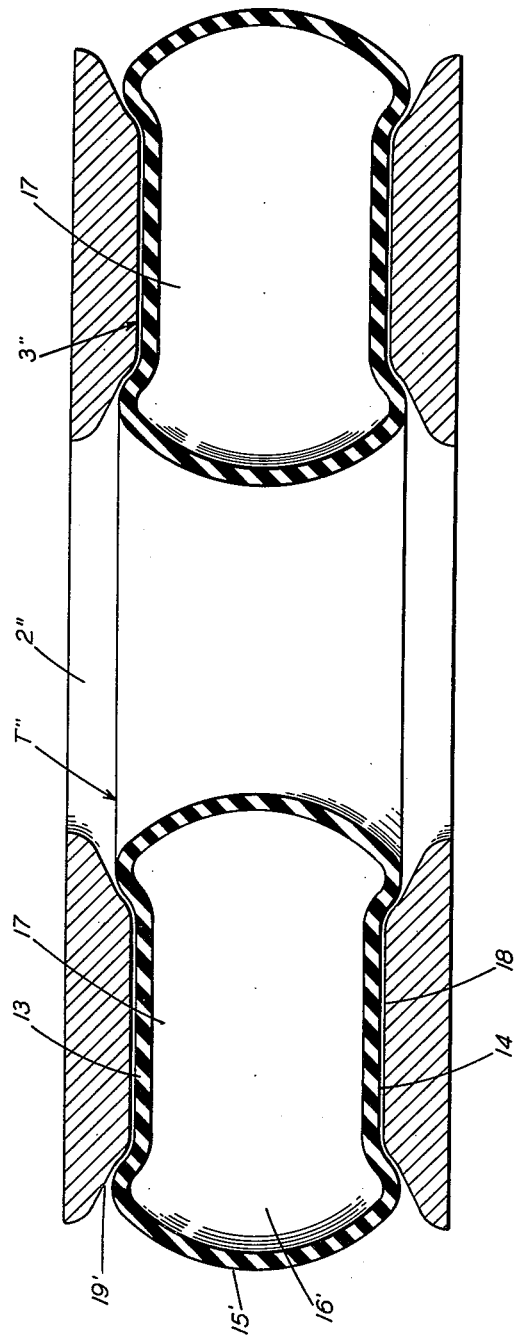
FIG. VII
INVENTOR.
HULIE E. BOWERMAN
BY
*GeWaldrop*
ATTORNEY

United States Patent Office 3,044,596
Patented July 17, 1962

3,044,596
LONG STROKE HIGH SPEED CLUTCH TUBE
Hulie E. Bowerman, 904 Meadow Oaks, Arlington, Tex.
Filed Jan. 13, 1958, Ser. No. 708,613
6 Claims. (Cl. 192—88)

This invention relates to inflatable tubes of the type used to engage such mechanisms as clutches, brakes, power tools and the like, such tubes being referred to generally in the trade as "clutch tubes" although not limited in their use to any specific mechanism.

The purpose of this invention is to provide a tube of this type which is suitable to operate between two plates to engage a mechanism whereby to rotate both plates and tube as a unit up to extremely high speeds, or to engage a rotating member by a stationary member whereby to retard or stop the rotating member.

The primary object is to provide an inflatable tube of the type described wherein an external plate engaging surface of the tube and the plate are constructed in such a manner as to eliminate relative movement between these parts due to centrifugal force when the tube or associated mechanism are rotating at high speeds.

Another object is to provide a tube of this type having external projecting beads on its outer surface to engage corresponding recesses in the adjacent plate faces for the purpose of preventing relative radial movement between the tube and plates.

A further form of this invention is to provide an inflatable toroidal clutch tube which includes a circumferential recess between its outer and inner diameters which recess varies from deep to shallow while the clutch is being inflated, but which is at all times sufficient to prevent the tube from becoming dislodged from its operating position.

And yet another object is to provide an inflatable toroidal clutch tube which includes a circumferential recess between its outer and inner diameters which engages a mating projection on the clutch face plates and wherein the clutch tube includes a substantial cross-sectional radius at both its outer and inner diameters to permit free flexing of the tube in inflation and deflation and wherein the flexing is unrestrained by either of the clutch plates.

An additional object is to provide a pair of clutch plates for mating with an inflatable tube having a cross section of large end radii wherein the plates are contoured to the same radii to permit inflation of the tube to progress without any apparent friction due to its contact with the plates.

And another objection is to provide a substantially flat clutch tube having large cross-section radius ends and being engaged by a pair of contour plates wherein the end radii may flex freely upon inflation and deflation and the contour plates will move in a parallel relationship by constant engagement of the flat surfaces of the clutch tube without causing any friction or binding on the tube.

Another object of this invention is to provide an inflatable clutch tube with freely flexible cross-sectional ends and a pair of mating contour plates to be engaged by the tube which tube and plates are rugged and durable and yet extremely efficient and suitable for the purpose intended.

These and other objects will be apparent from examination of the following specification and drawings in which:

FIGURE I represents a plan view of one embodiment of the clutch tube of this invention wherein the clutch plates are shown in phantom outline.

FIGURE II is a cross-sectional view of the tube taken along the lines 2—2 of FIGURE I.

FIGURE III is a plan view similar to FIGURE I for a second embodiment of the tube of this invention.

FIGURE IV is a cross-sectional view of the tube taken along the lines 4—4 of FIGURE III.

FIGURE V is a plan view of the tube of a third embodiment of this invention.

FIGURE VI is a cross-sectional view taken along the lines 6—6 of FIGURE V.

FIGURE VII is a fragmentary detail view of the cross section of FIGURE VI utilizing a tube having an extra long stroke.

Referring now more particularly to the characters of reference on the drawing it will be observed in FIGURES I and II that the tube T of this invention is adapted to operate between two face plates 2 in mating relation to the recessed contour 3 when pressurized fluid is admitted thru spud 4. This embodiment comprises a toroidal ring 5 of flexible material having a cross section as in FIGURE II and being composed of side-walls 6 and end members 7 defining small flat internal cavity 8 and circular end cavities 9 which expand and enlarge when filled with fluid under pressure thru spud 4. The internal cavity 8 of tube T enlarges at its ends into circular cavities 9 to permit easy flexing of the sidewalls 6 and to thus permit the outer surfaces 10 to expand outwardly in near parallel relationship. Projections 11 on the outer surfaces 10 form circular ribs as seen in FIGURE II to engage mating grooves 12 in the adjacent face plates 2 upon inflation. This engagement prevents clutch tube T from becoming dislodged in operation or from slipping in position due to centrifugal force.

Instead of the mating circular ribs and grooves I may provide mating indentations and projections and either form may be provided on either the face plates or the tubes as desired.

However, it is impractical to extend projections 11 indefinitely in height to accommodate large stroke apparatus and the tube T is itself limited in stroke. To overcome these limitations, a second embodiment is shown in FIGURES III and IV which will provide for an increased stroke in both the construction of the tube T' and in the contour plates 2'. It will be apparent that the size and stroke here can be greatly increased over that possible by utilization of the embodiment of FIGURES I and II. In this tube T' the cross section sidewalls 13 are substantially the same thickness throughout the entire length and the major length of their outer surface is flat and continuous as at flats 14. At each end the outer surface assumes an enlarged circular shape and is indicated as end members 15 having enlarged internal cavities 16 which are connected by flat cavity 17. Contour plates 2' include end recesses 19 which are shaped to follow the outer circumference of end members 15. In operation when pressurized fluid is introduced thru spud 4 the internal volume of tube T' expands forcing surface 14 against plate surface 18 with sufficient pressure to move plate or plates 2' outward to engage an operating mechanism (not shown). During this action the end members expand slightly but as they do, recess 19 has moved outward and away from end member 15. Then when the tube T' deflates, end members 15 contracts to fit into the approaching recess 19. This embodiment is thus seen to permit a large expansion of tube T' with a substantial pressure transfer area (as at 14) against contour plate surface 18 and yet in which combination it is impossible for tube T' to move radially due to centrifugal force.

To improve performance, facilitate manufacture, and increase the economy of the contour plate and clutch tube combination of this invention a third embodiment has been devised as is seen in FIGURES V and VI. This embodiment consists of a contour plate 2" and an inflatable clutch tube T' which may be identical to the tube of the embodiment shown in FIGURE IV. The parts of the tube shown in FIGURE VI bear the same reference numbers as identical corresponding parts of FIGURE IV. The plate 2" is contoured to fit the external surface 14 of tube T' up to less than one-fourth of the circumference of the end members 15. While the plate 2" of this embodiment has slightly less surface contact with tube T' due to the reduced area of recess 19', the ease and economy of manufacture due to the removal of the high precision fit 19 more than offsets the theoretical disadvantage. In this embodiment the end members 15 are free to flex and will assume contact with the recess 19' when tube T' is deflated. When the tube T' is inflated the end members 15 expand and the surface 15 in contact with recess 19' gradually moves out of contact with no friction or binding.

By selection of the proper material and dimensions of the tube, indicated at T", and using the same contour plates 2", a greatly increased stroke 5 may be obtained as illustrated in FIGURE VII. The end members 15' here will permit a very long stroke and the cut-away recess 19' of contour plates 2" cooperate with the end members of tube T" to provide a slip free, uniformly loaded clutch engagement.

From the foregoing description, it will be readily seen that there has been produced a device which substantially fulfills the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described the invention, the following is claimed as new and useful, and upon which Letters Patent is desired:

1. A long stroke clutch actuating device comprising an inflatable flattened toroidal resilient bladder including radially disposed substantially flat mutually parallel side walls joined by arcuate inner and outer end walls and the external contour of said bladder including annularly extending enlargements projecting beyond the radial side walls in the direction of the toroidal axis and located in the vicinity of the intersections of the side walls and the end walls; a radial annular face plate engaging each radial side wall and concentric with the axis of rotation of said toroidal bladder, the space between the side walls within the bladder when deflated being narrow in the axial direction and enlarging to form larger cross-section similar toroidal bulbs in the vicinity of the end walls to provide for long stroking of the side walls in the axial direction, and the face plates having recesses near their inner and outer peripheries extending away from the side walls and receiving in said recesses in complementary engagement said enlargements of the external contour of the bladder to prevent radial movement of the bladder with respect to the face plate.

2. In a device as set forth in claim 1, said enlargements comprising annular ribs on the side walls concentric with the bladder and extending substantially axially outwardly normal to the plane of the side wall, and said recess comprising complementary annular grooves in the face plates.

3. In a device as set forth in claim 1, the inner and outer end walls forming said bulbs being exteriorly enlarged in the axial direction of the bladder and comprising said enlargements which engage said recesses.

4. In a device as set forth in claim 3, said recesses comprising annular arcuate recesses in the face plates substantially complementary in shape to the portions of the end walls which form said bulbs.

5. In a device as set forth in claim 3, said recesses comprising rounded chamfers on the inner and outer peripheries of the face plates and fitting the external contours of the bladder when deflated.

6. A clutch actuating device comprising a flattened toroidal resilient bladder including radially disposed substantially flat mutually parallel side walls joined by curved inner and outer end walls; at least one annular rib on each side wall concentric with the toroidal bladder and extending outwardly normal to the plane of the side wall; and a face radially disposed plate engaging each flat side wall and the face plates having annular grooves complementary in shape to said ribs and receiving the latter to prevent radial movement of the side walls with respect to the plates.

References Cited in the file of this patent

UNITED STATES PATENTS

| | | |
|---|---|---|
| 2,213,000 | Fawick | Aug. 27, 1940 |
| 2,555,772 | Wickwire | June 5, 1951 |
| 2,563,673 | Cardwell | Aug. 7, 1951 |
| 2,688,983 | Bowerman | Sept. 14, 1954 |
| 2,745,435 | Hobbs | May 15, 1956 |
| 2,765,061 | Fawick | Oct. 2, 1956 |

FOREIGN PATENTS

| | | |
|---|---|---|
| 372,825 | France | Mar. 1, 1907 |